(12) United States Patent
Bendorf (10) Patent No.: US 11,705,600 B2
(45) Date of Patent: Jul. 18, 2023

(54) ELECTRONIC TORQUE WRENCH WITH INTERCHANGEABLE BATTERY

(71) Applicant: SNAP-ON INCORPORATED, Kenosha, WI (US)

(72) Inventor: Scott A. Bendorf, Kenosha, WI (US)

(73) Assignee: SNAP-ON INCORPORATED

( * ) Notice: Subject to any disclaimer, the term of this patent is extended or adjusted under 35 U.S.C. 154(b) by 667 days.

(21) Appl. No.: 16/563,002

(22) Filed: Sep. 6, 2019

(65) Prior Publication Data

US 2021/0069878 A1 Mar. 11, 2021

(51) Int. Cl.
| | |
|---|---|
| *H01M 50/247* | (2021.01) |
| *B25B 23/142* | (2006.01) |
| *H02K 7/14* | (2006.01) |
| *H01M 50/207* | (2021.01) |
| *H01M 50/262* | (2021.01) |
| *H01M 50/296* | (2021.01) |
| *H01M 50/267* | (2021.01) |

(52) U.S. Cl.
CPC ....... *H01M 50/247* (2021.01); *B25B 23/1425* (2013.01); *H01M 50/207* (2021.01); *H01M 50/262* (2021.01); *H01M 50/267* (2021.01); *H01M 50/296* (2021.01); *H02K 7/145* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 5,164,761 A * | 11/1992 | Isono | G01R 31/3648 396/301 |
| 5,670,267 A | 9/1997 | Lee | |
| 5,933,496 A | 8/1999 | McKinnon | |
| 6,238,058 B1 * | 5/2001 | Lin | B25B 23/18 362/120 |
| 6,463,811 B1 * | 10/2002 | Putney | B25B 23/1425 73/862.21 |

(Continued)

FOREIGN PATENT DOCUMENTS

| | | |
|---|---|---|
| CN | 101958407 | 1/2011 |
| CN | 203688958 | 7/2014 |

(Continued)

OTHER PUBLICATIONS

ACDelco ARM 601-3 product information manual, pp. 1-40. (Year: 2013).*

(Continued)

*Primary Examiner* — Gregg Cantelmo
(74) *Attorney, Agent, or Firm* — Seyfarth Shaw LLP (57) ABSTRACT

An electronic torque wrench with a battery receptacle adapted to receive either a unitary battery pack or a battery tray containing separate batteries inside. The battery tray can receive conventional batteries such as AA, AAA, C, D or 9-volt sized batteries, and the battery tray and unitary battery can be constructed of a similar geometry to fit within the battery receptacle. The battery tray and unitary pack can include an outwardly-extending protrusion that is received within a groove of the battery receptacle. In this manner, only the specially-designed battery tray and pack are capable of coupling with the receptacle.

18 Claims, 8 Drawing Sheets

(56) References Cited

U.S. PATENT DOCUMENTS

| | | |
|---|---|---|
| 6,525,511 B2 | 2/2003 | Kubale et al. |
| 6,621,246 B2 | 9/2003 | Kubale et al. |
| 6,656,626 B1 | 12/2003 | Mooty et al. |
| 6,840,335 B1* | 1/2005 | Wu .......................... B25F 5/02 173/217 |
| 6,876,173 B2 | 4/2005 | Mastaler et al. |
| 6,921,285 B2 | 7/2005 | Glauning |
| 6,965,214 B2 | 11/2005 | Kubale et al. |
| 6,968,908 B2 | 11/2005 | Tokunaga et al. |
| 7,183,745 B2 | 2/2007 | Kubale et al. |
| 7,339,350 B2 | 3/2008 | Kubale et al. |
| 7,443,137 B2 | 10/2008 | Scott et al. |
| 7,453,234 B2 | 11/2008 | Phillips et al. |
| 7,823,486 B2 | 11/2010 | Wise |
| 8,172,607 B2 | 5/2012 | Chiapuzzi |
| 8,237,404 B2 | 8/2012 | Takano et al. |
| 8,316,741 B2 | 11/2012 | Wallgren |
| 8,354,183 B2 | 1/2013 | Konuma et al. |
| 9,065,155 B2 | 6/2015 | Takano et al. |
| 9,272,397 B2 | 3/2016 | Goetz et al. |
| 9,415,499 B2 | 8/2016 | Brotto et al. |
| 9,746,860 B2 | 8/2017 | Sakaue et al. |
| 9,776,309 B2 | 10/2017 | Fluhrer |
| 9,871,370 B2 | 1/2018 | Friedman et al. |
| 10,027,078 B2 | 7/2018 | Knight |
| 10,131,042 B2 | 11/2018 | Mergener et al. |
| 10,131,043 B2 | 11/2018 | Mergener et al. |
| 10,213,908 B2 | 2/2019 | Mergener et al. |
| 2002/0125857 A1 | 9/2002 | Mastaler et al. |
| 2003/0094081 A1* | 5/2003 | Becker ................ B25B 23/1425 81/479 |
| 2003/0203669 A1* | 10/2003 | Glauning ............ H01M 50/296 439/500 |
| 2005/0126351 A1 | 6/2005 | Becker et al. |
| 2005/0218867 A1 | 10/2005 | Phillips |
| 2007/0210744 A1 | 9/2007 | Watson et al. |
| 2008/0311795 A1 | 12/2008 | Brotto et al. |
| 2009/0277313 A1* | 11/2009 | Wise ....................... B25B 13/46 81/479 |
| 2010/0096151 A1 | 4/2010 | Ostling |
| 2012/0073847 A1 | 3/2012 | Nagasaka et al. |
| 2012/0168189 A1 | 7/2012 | Eckert |
| 2013/0196203 A1* | 8/2013 | Wackwitz ................ B25F 5/00 429/96 |
| 2014/0295257 A1 | 10/2014 | Harada |
| 2015/0007699 A1* | 1/2015 | Lee ..................... B25B 23/1425 81/180.1 |
| 2015/0214520 A1 | 7/2015 | Nishikawa et al. |
| 2015/0280516 A1 | 10/2015 | Ekstrom et al. |
| 2015/0340921 A1 | 11/2015 | Suda et al. |
| 2016/0329729 A1 | 11/2016 | Brotto et al. |
| 2016/0372939 A1* | 12/2016 | Roehm ................. H02J 7/0013 |
| 2017/0279095 A1* | 9/2017 | Reese ....................... B25F 5/02 |
| 2018/0071901 A1* | 3/2018 | Silha .................. B25B 23/1425 |
| 2018/0138690 A1 | 5/2018 | Friedman et al. |
| 2018/0316147 A1 | 11/2018 | Knight |
| 2018/0342932 A1 | 11/2018 | Wachter et al. |

FOREIGN PATENT DOCUMENTS

| | | | |
|---|---|---|---|
| CN | 203688958 U | | 7/2014 |
| CN | 203882069 | | 10/2014 |
| CN | 203882069 U | | 10/2014 |
| CN | 104275662 A | | 1/2015 |
| EP | 2892085 A2 | | 7/2015 |
| GB | 2386746 A | | 9/2003 |
| JP | H0566867 U | * | 9/1993 |
| JP | 08162080 A | * | 6/1996 |
| TW | M243342 U | | 9/2004 |
| TW | M322861 U | | 12/2007 |
| TW | M360114 U | | 7/2009 |
| TW | I319734 B | | 1/2010 |
| TW | M419657 U | | 1/2012 |
| TW | M444251 U | | 1/2013 |
| TW | I504486 B | | 10/2015 |
| TW | I609746 B | | 1/2018 |
| TW | M556196 U | | 3/2018 |
| TW | I701107 B | | 8/2020 |
| WO | 2015188560 A1 | | 12/2015 |
| WO | 2018068325 | | 4/2018 |
| WO | 2018068325 A1 | | 4/2018 |

OTHER PUBLICATIONS

Taiwan Office Action for corresponding TW Application No. 109130315, dated Nov. 11, 2021, 3 pages.
Canadian Office Action for corresponding CA Application No. 3,091,382, dated Dec. 1, 2021, 7 pages.
Australian Examination Report No. 2 for corresponding AU Application No. 2020217407, dated Dec. 17, 2021, 3 pages.
Examination Report No. 1 for corresponding Application No. 2020217407 dated Jul. 12, 2021, 4 pages.
Combined Search and Examination Report for Application No. GB2012535.7 dated Feb. 1, 2021, 7 pages.
Chinese Office Action for corresponding Application No. 202010865542.0 dated Jul. 8, 2022, 8 pages.
Taiwan Office Action for corresponding Application No. 11120688010 dated Jul. 14, 2022, 17 pages.
Canadian Office Action for corresponding Application No. 3091382 dated May 27, 2022, 5 pages.

* cited by examiner

ELECTRONIC TORQUE WRENCH WITH INTERCHANGEABLE BATTERY

TECHNICAL FIELD OF THE INVENTION

The present invention relates generally to electronic torque wrenches. More particularly, the present invention relates to electronic torque wrenches with a battery receptacle adapted to receive a unitary battery pack or a battery tray that can hold conventional dry cell-type batteries.

BACKGROUND OF THE INVENTION

Electronic torque wrenches are a common tool used with, for example, automotive repair. Electronic torque wrenches measure various parameters of torque applied by the tool to work pieces, such as bolts or nuts, to ensure a proper torqueing operation is performed. For example, an electronic torque wrench can measure the amount of torque or the angle of rotation applied by the tool to a bolt. Some electronic torque wrenches can provide a visual or tactile indication to the user that the proper torqueing operation has been performed when, for example, a predetermined amount of torque or angular rotation has been applied to a work piece.

Conventional electronic torque wrenches are typically battery powered. Some electronic torque wrenches require a unitary battery pack that is specially designed for either the model of electronic torque wrench or for multiple power tools manufactured by the same manufacturer, thus limiting their operability with other types of tools. Other electronic torque wrenches that directly receive conventional batteries, such as AA, AAA, or 9 V batteries.

SUMMARY OF THE INVENTION

The present invention broadly comprises an electronic torque wrench with a battery receptacle adapted to receive either (1) a unitary battery pack; or (2) a battery tray containing separate batteries inside. The batteries received by the battery tray can be conventional dry cell-type batteries such as AA, AAA, or 9 V batteries, for example. The battery tray and unitary battery can be constructed of a similar geometry to fit within the battery receptacle. For example, the battery tray and unitary pack can include an outwardly-extending protrusion that is received within a groove of the battery receptacle to permit only the specially-designed battery tray and pack to releasably couple with the receptacle.

In particular, the present invention broadly comprises a tool including a head extending from a handle, and a base coupled to the head and dimensioned to receive either a battery tray or a unitary battery pack. The battery tray includes receiving areas dimensioned to receive conventional batteries within the receiving areas, a tray interface that releasably couples with the base, and tray terminals that electrically connect the battery tray to the base. The unitary battery pack includes a dedicated battery, a battery interface that releasably couples with the base, and battery pack terminals that electrically connect the battery pack to the base.

The present invention further broadly comprises a tool including a drive that applies torque to work pieces, and a base coupled to the drive and receiving a battery. The battery is interchangeable between a battery tray and a unitary battery. The battery tray includes a receiving area dimensioned to receive conventional batteries therein, a tray interface that releasably couples with the base, and tray terminals that electrically connect the battery tray to the base. The unitary battery pack including a dedicated battery, a battery interface that releasably couples with the base, and battery pack terminals that electrically connect the battery pack to the base.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an electronic torque wrench with a battery receptacle capable of receiving either a unitary battery pack or a battery tray containing separate batteries inside. The battery tray can receive conventional batteries, such as, for example, one or more AA, AAA, C, D or 9-volt sized batteries. Further, the battery tray and unitary battery can have a similar geometry to fit within the same battery receptacle. In some embodiments, the battery tray and unitary pack can include an outwardly-extending protrusion that is received within a groove of the battery receptacle to permit only the specially-designed battery tray and pack to couple with the receptacle.

Referring to FIGS. 1-4, a tool 100, such as an electronic torque wrench, can include a head 105 extending from a handle 110 and a drive 115 to couple with a socket (not shown) to apply torque to a work piece. The handle 110 can include a display 120 and keypad 125 to receive input from the user of the tool 100 and display outputs to the user. For example, the user can input a desired torqueing parameter to be reached by the tool 100 by using the keypad 125 and, when the desired torque or other parameter is reached, the display 120 can notify the user. In an embodiment, a separate indicator can be located on the tool 100 in any location to provide a tactile or visual indication when the tool 100 reaches the desired torqueing parameter.

The tool 100 can further include a base 130 releasably coupled to a battery pack 135 via an interface 140. The battery pack 135 can include a tower 143 that inserts into a corresponding cavity within the base 130, and one or more latches 146 that are spring-biased to a closed position. When the battery pack 135 is inserted into the base 130, the latch 146 can be pushed open and then close under the bias of the spring to couple with the anchor 147, thereby removably coupling the battery pack 135 to the tool 100. When the user desires to remove the battery pack 135, for example to charge the battery pack 135, the user can push inwardly on the latch 146 to remove the bias force applied against the anchor 147 and pull the battery pack 135 axially outwardly. As shown, the battery pack 135 is a unitary battery pack, meaning it includes a dedicated battery and does not require insertion of additional batteries, such as required by the battery tray, discussed below in more detail.

Figure 1:
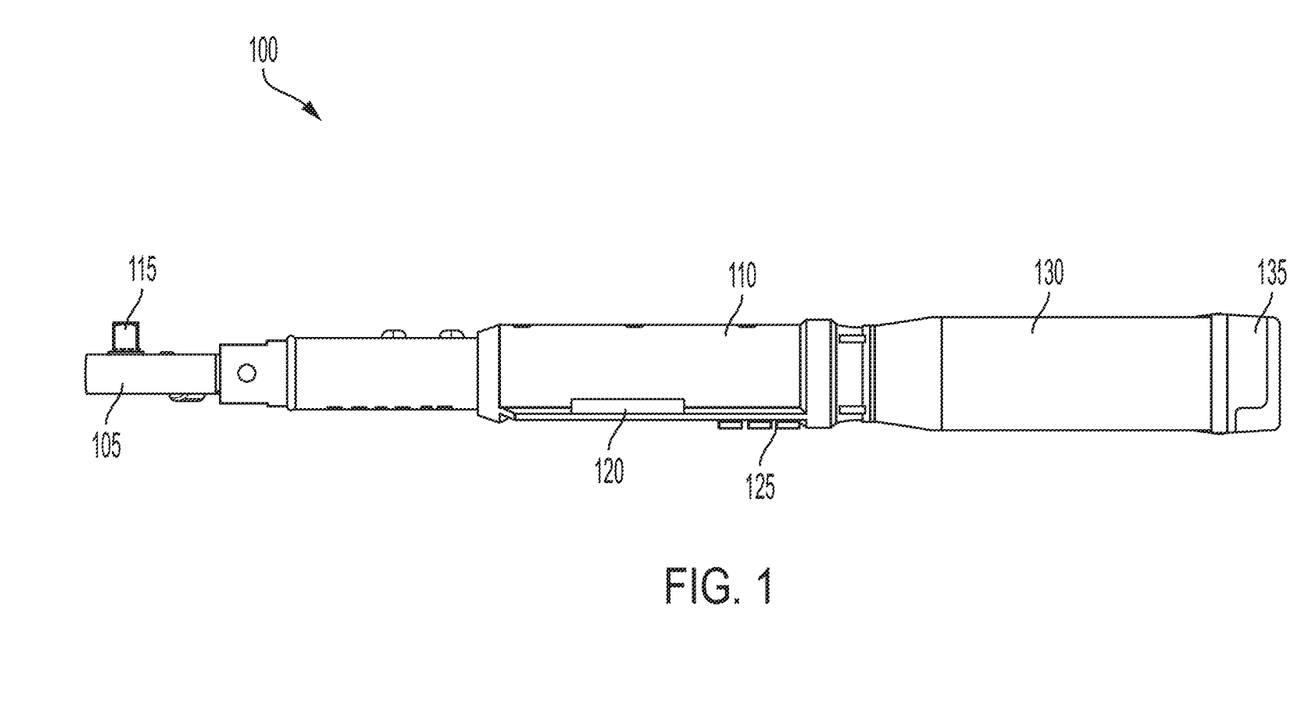
FIG. 1 is a side view of a tool coupled to a battery pack according to an embodiment of the present invention.
Figure 2:
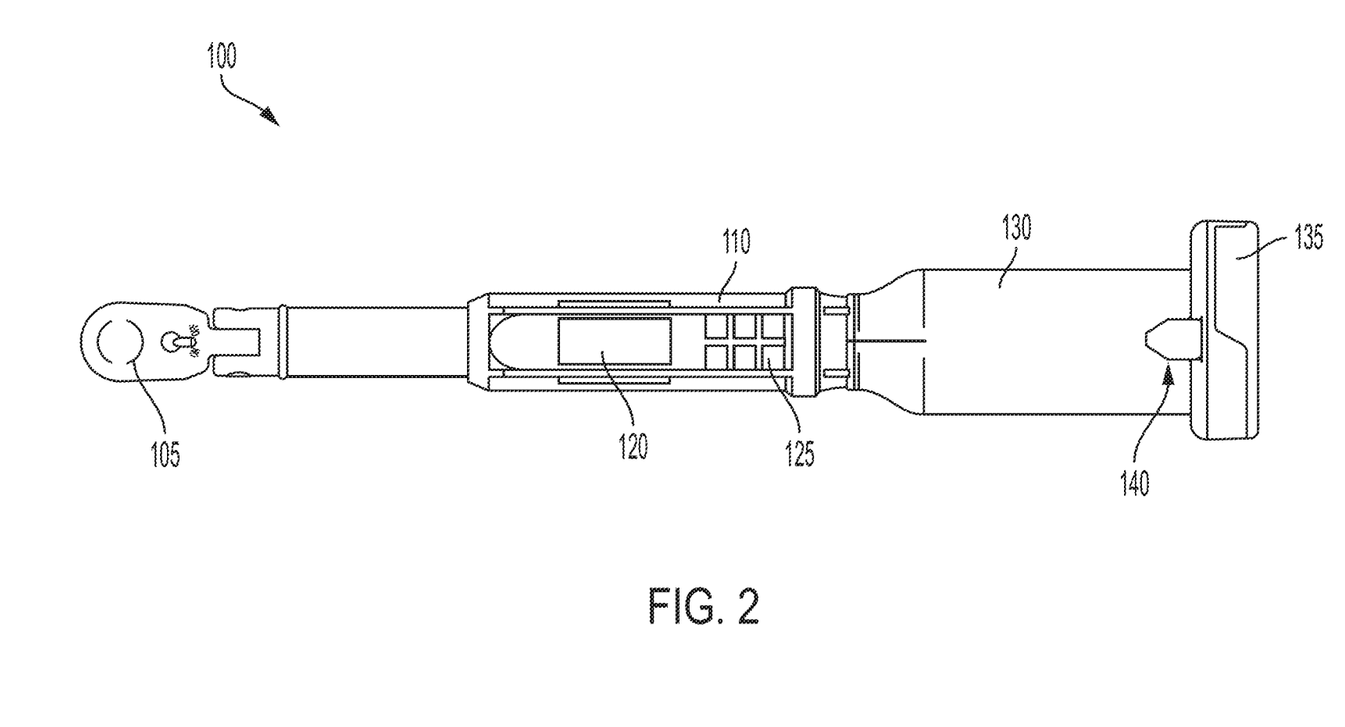
FIG. 2 is a bottom view of a tool coupled to a battery pack according to an embodiment of the present invention.
Figure 3:
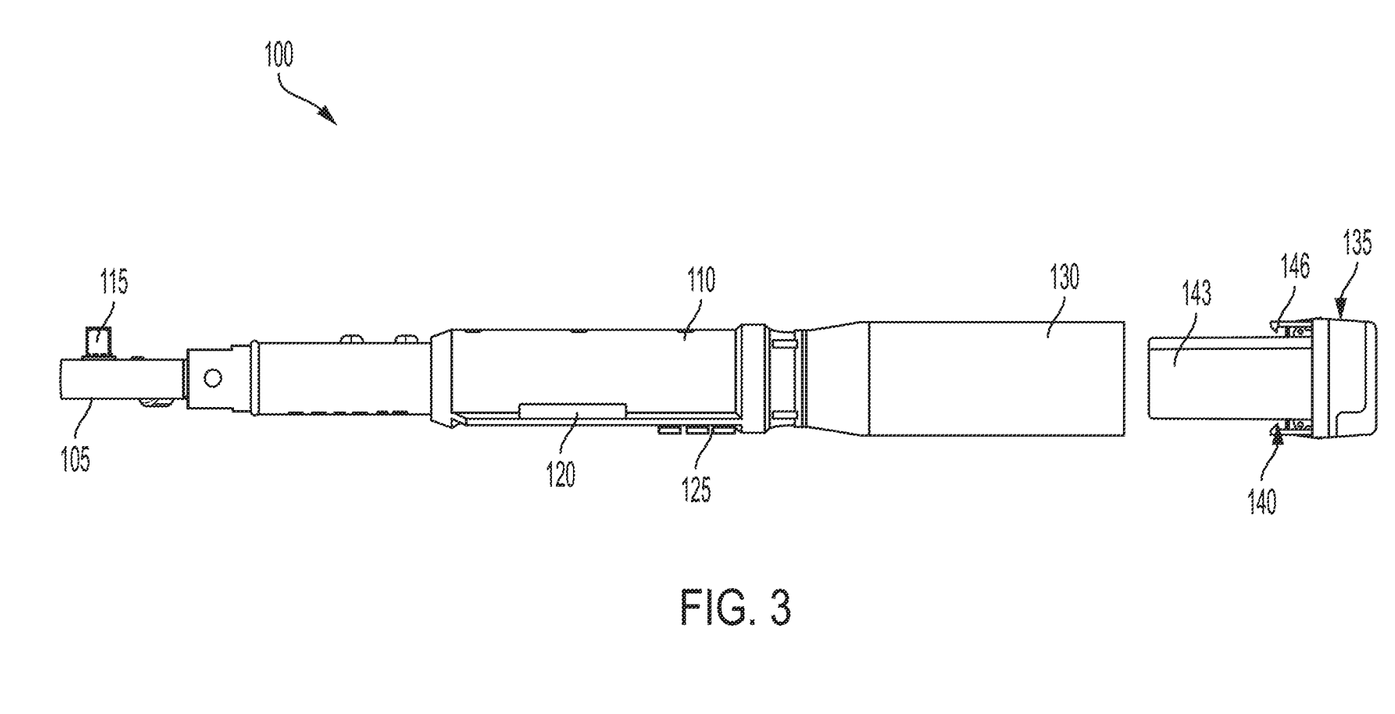
FIG. 3 is a side, partially-disassembled view of a tool with a battery pack according to an embodiment of the present invention.
Figure 4:
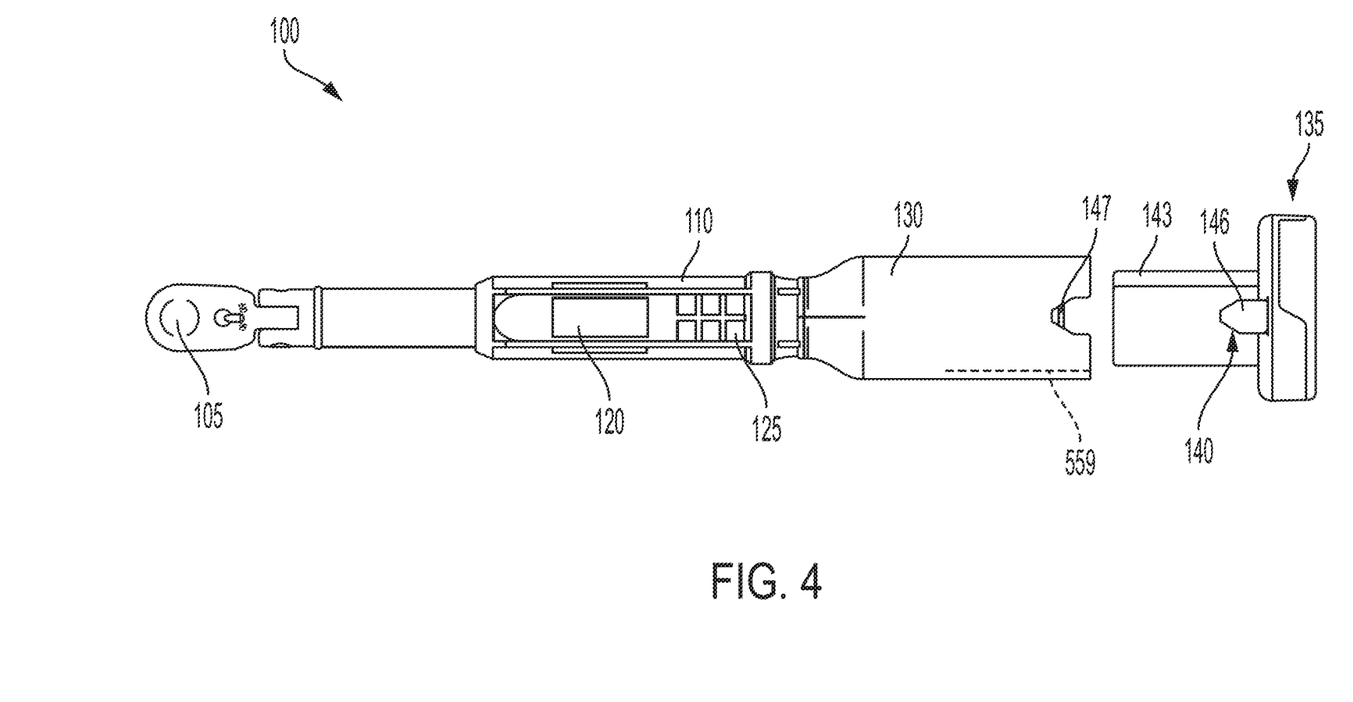
FIG. 4 is a bottom, partially-disassembled view of a tool with a battery pack according to an embodiment of the present invention.
Figure 5:
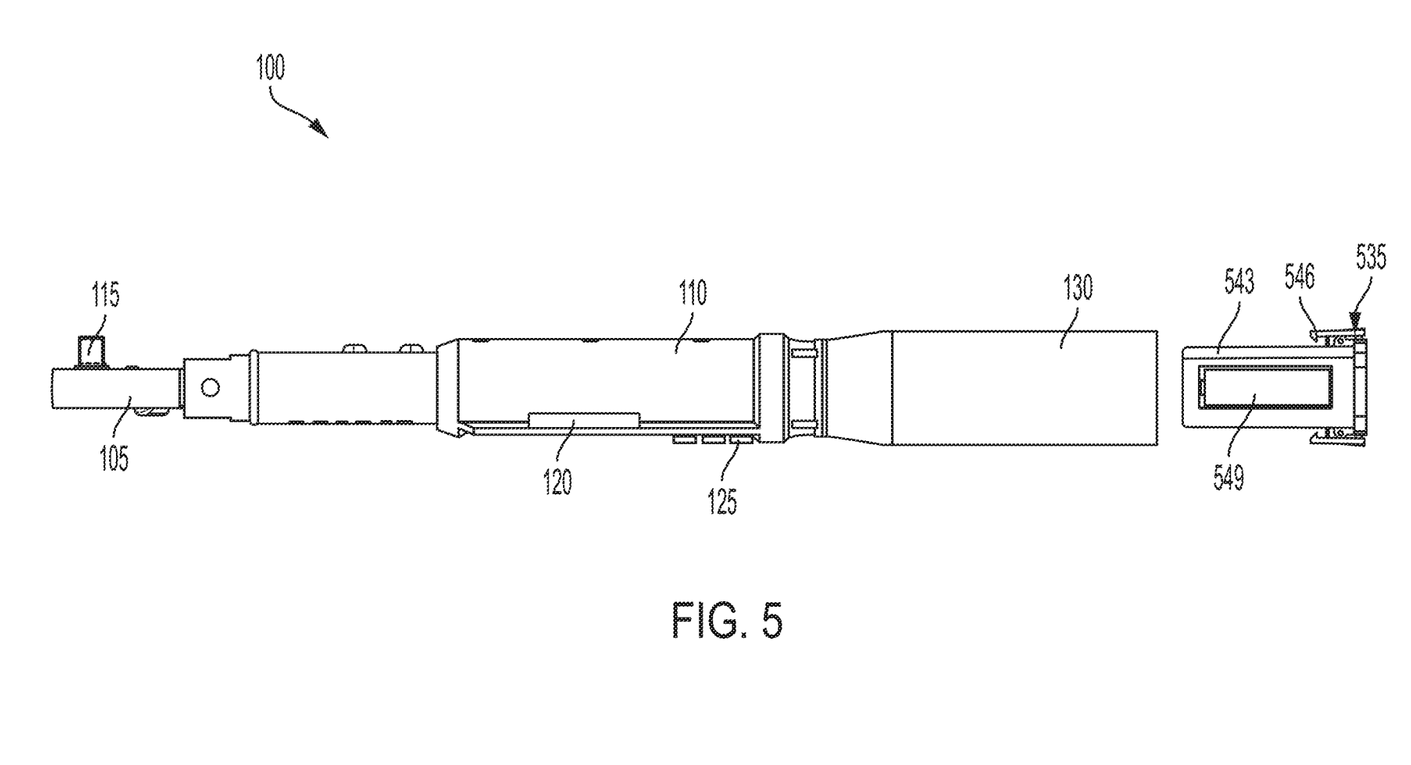
FIG. 5 is a side, partially-disassembled view of a tool with a battery tray according to an embodiment of the present invention.
Figure 6:
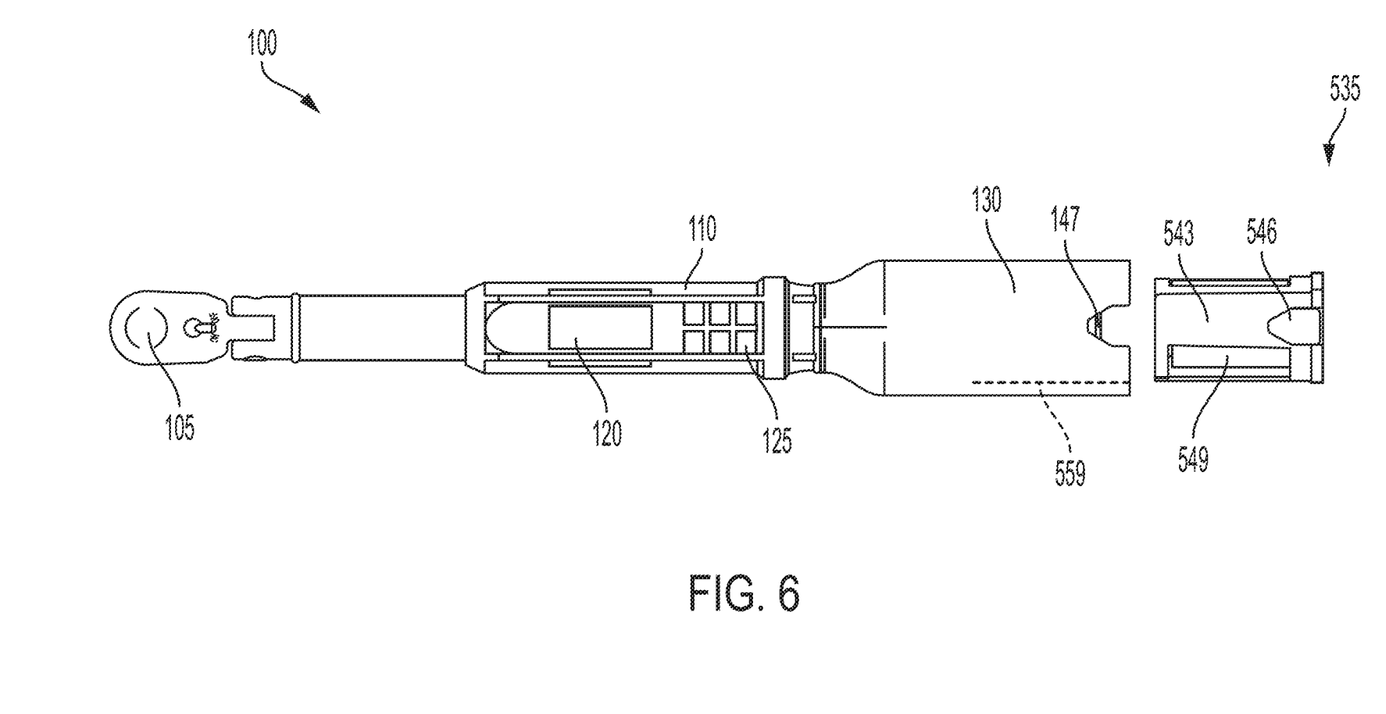
FIG. 6 is a bottom, partially-disassembled view of a tool with a battery tray according to an embodiment of the present invention.
Figure 7:
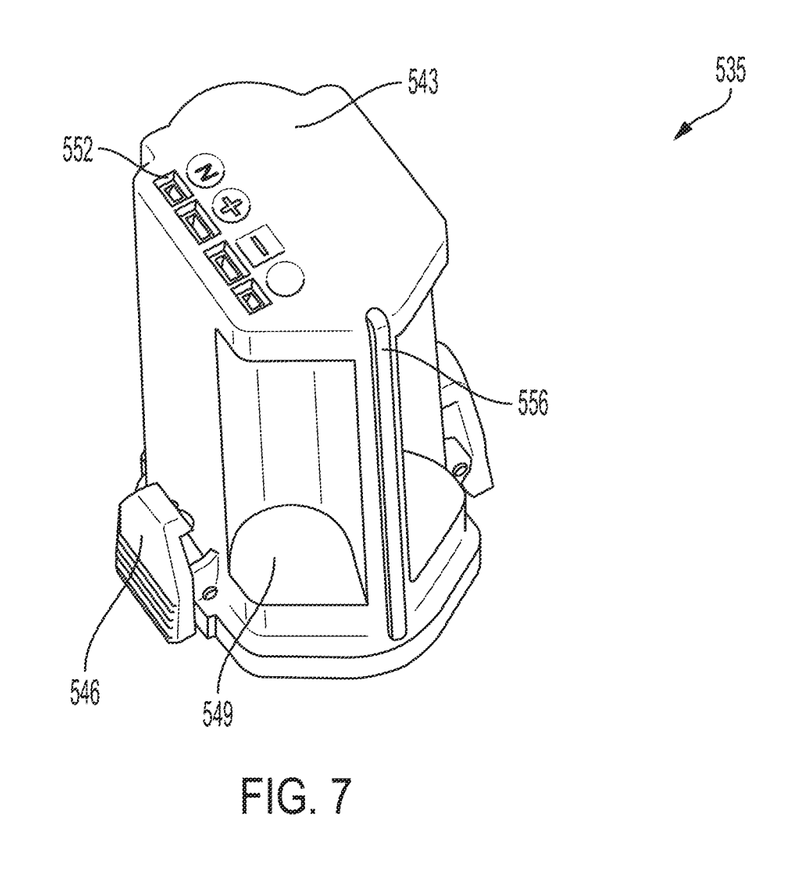
FIG. 7 is a top perspective view of a battery tray according to an embodiment of the present invention.
Figure 8:
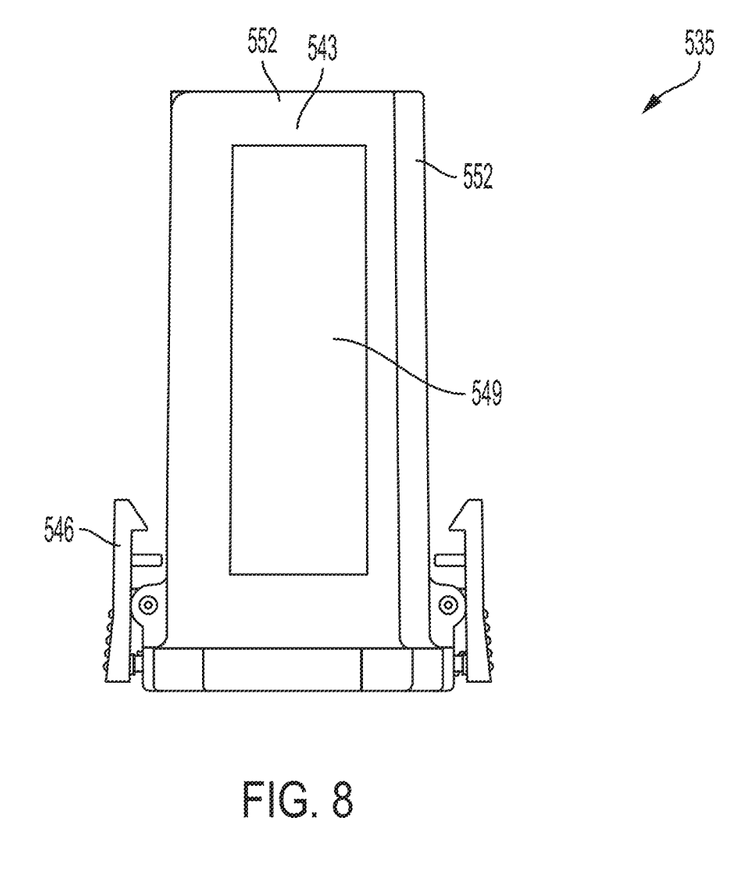
FIG. 8 is a side view of a battery tray according to an embodiment of the present invention.

FIGS. 5-6 illustrate a battery tray 535 inserted into the base 130, and FIGS. 7-8 illustrate the battery tray 535 itself. As shown, the battery tray 535 can include a tower 543 and latches 546 that couple with an anchor 147, similar to the embodiment of FIGS. 1-4. The battery tray 535 can include one or more receiving areas 549 that receive conventional batteries such as, for example, AA, AAA, C, D or 9-volt sized batteries. In this manner, the battery tray 535 can receive conventional batteries and releasably couple with and power the tool 100 in the same manner that the battery pack 135 of FIGS. 1-4 releasably couples with and powers the tool 100.

As shown in FIGS. 7-8, the battery tray 535 can have generally the same geometry as the battery pack 135 and can therefore be insertable into the base 130 of the tool 100 in the same mechanical and electrical manner as the battery pack 135. For example, the battery tray 535 can include terminals 552 that electrically couple to a power circuit of the tool 100, and a protrusion 556 that cooperatively engages a corresponding groove 559 within the tool 100. For example, the protrusion 556 can extend axially along the battery tray 535 and insert into a corresponding axially-extending groove 559 within the base 130 of the tool 100. In this manner, the battery pack 135 and the battery tray 535 can be shaped to interface with the tool 100 in an exchangeable manner.

The present invention allows the versatility of using conventional batteries such as, AA, AAA, C, D and/or 9-volt sized batteries, within a battery tray while also allowing the tray to power the tool 100. For example, the battery tray 535 can receive the same type of battery (e.g., AA), or a mixture of different sized batteries (e.g., AA and AAA), and by coupling to a power circuit on the battery tray 535, can provide the necessary output to power the tool 100. The present invention also allows the tool 100 to be provided with a unitary battery such as those often seen with conventional power tools.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool and battery system, comprising:
an electrically powered tool including a base having a battery receptacle and a groove;
a battery tray including:
a tray base portion,
a tray tower portion adapted to be received in the battery receptacle, the tray tower portion includes a receiving area dimensioned to receive a conventional battery tray battery therein that can be removed from the receiving area,
a tray protrusion extending longitudinally along the tray tower portion and that is adapted to engage the groove when the tray tower portion is received in the battery receptacle,
a tray latch coupled to the tray base portion and that releasably couples with the base, and
tray terminals that electrically connect the battery tray battery in the battery tray to the electrically powered tool when the tray tower portion is received in the battery receptacle; and
a unitary battery pack including:
a battery pack base portion,
a battery pack tower portion adapted to be received in the battery receptacle when the battery tray is not received in the battery receptacle,
a battery pack battery,
a battery latch coupled to the battery pack base portion and that releasably couples with the base, and
battery pack terminals that electrically connect the battery pack battery in the unitary battery pack to the electrically powered tool when the battery pack tower portion is received in the battery receptacle, and
wherein the tray base portion is smaller than the battery pack base portion.

2. The tool and battery system of claim 1, wherein the unitary battery pack includes a battery pack protrusion extending longitudinally along the battery pack tower portion and that is adapted to engage the groove when the tray battery pack tower portion is received in the battery receptacle.

3. The tool and battery system of claim 1, wherein the tray protrusion and groove extend in an axial direction along the electrically powered tool when the tray tower portion is received in the battery receptacle.

4. The tool and battery system of claim 1, wherein the battery tray battery is at least one of AA, AAA, C, D or 9-volt sized batteries.

5. The tool and battery system of claim 4, wherein the battery tray battery includes multiple batteries of a same type selected from AA, AAA, C, D or 9-volt sized batteries.

6. The tool and battery system of claim 4, wherein battery tray battery includes multiple batteries that are a different types selected from AA, AAA, C, D or 9-volt sized batteries.

7. The tool and battery system of claim 1, wherein the base includes an anchor for separately receiving the tray latch and the battery latch.

8. The tool and battery system of claim 1, wherein the electrically powered tool further includes a keypad that receives user input and a display for displaying at least the user input.

9. The tool and battery system of claim 8 wherein each of the unitary battery pack and battery tray is separately adapted to provide power to operate the keypad and display.

10. A tool and battery system, comprising:
   an electrically powered tool including:
      a drive adapted to apply torque to a work piece; and
      a base coupled to the drive and including a battery receptacle and a groove;
   a battery tray including:
      a tray base portion,
      a tray tower portion adapted to be received in the battery receptacle, the tray tower portion includes a receiving area dimensioned to receive conventional batteries therein,
      a tray protrusion extending longitudinally along the tray tower portion and that is adapted to engage the groove when the tray tower portion is received in the battery receptacle,
      a tray latch coupled to the tray base portion and that releasably couples with the base, and
      tray terminals that electrically connect the batteries in the battery tray to the electrically powered tool when the tray tower portion is received in the battery receptacle; and
   a unitary battery pack including:
      a battery base portion,
      a battery tower portion adapted to be received in the battery receptacle when the battery tray is not received in the battery receptacle,
      a battery pack battery,
      a battery latch coupled to the battery base portion and that releasably couples with the base, and
      battery pack terminals that electrically connect the battery in the unitary battery pack to the electrically powered tool when the battery tower portion is received in the battery receptacle, and
   wherein the tray base portion is smaller than the battery base portion.

11. The tool and battery system of claim 10, wherein the battery pack includes a battery pack protrusion extending longitudinally along the battery pack tower portion and that is adapted to engage the groove when the battery tower portion is received in the battery receptacle.

12. The tool and battery system of claim 10, wherein the tray protrusion and groove extend in an axial direction along the electrically powered tool when the tray tower portion is received in the battery receptacle.

13. The tool and battery system of claim 10, wherein the conventional batteries are at least one of AA, AAA, C, D or 9-volt sized batteries.

14. The tool and battery system of claim 13, wherein the conventional batteries are a same type of battery selected from the group of AA, AAA, C, D or 9-volt sized batteries.

15. The tool and battery system of claim 13, wherein at least some of the conventional batteries are a different type of battery selected from the group of AA, AAA, C, D or 9-volt sized batteries.

16. The tool and battery system of claim 10, wherein the base includes an anchor for separately receiving the tray latch and the battery latch.

17. The tool and battery system of claim 10, wherein the electrically powered tool further includes a keypad that receives user input and a display for displaying at least the user input.

18. The tool and battery system of claim 17, wherein each of the unitary battery pack and battery tray is separately adapted to provide power to operate the keypad and display.

* * * * *